(12) United States Patent
Akyurek et al.

(10) Patent No.: US 9,844,033 B2
(45) Date of Patent: Dec. 12, 2017

(54) SYSTEM AND METHOD FOR DISTRIBUTED SCHEDULING OF TRANSMISSION RESOURCES

(71) Applicant: Texas Instruments Incorporated, Dallas, TX (US)

(72) Inventors: Alper S. Akyurek, La Jolla, CA (US); Ariton E. Xhafa, Plano, TX (US); Jianwei Zhou, Allen, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/054,508

(22) Filed: Feb. 26, 2016

(65) Prior Publication Data
US 2016/0270068 A1 Sep. 15, 2016

Related U.S. Application Data

(60) Provisional application No. 62/130,203, filed on Mar. 9, 2015.

(51) Int. Cl.
*H04B 5/00* (2006.01)
*H04W 72/04* (2009.01)

(52) U.S. Cl.
CPC ........ *H04W 72/04* (2013.01); *H04W 72/0406* (2013.01)

(58) Field of Classification Search
USPC .......... 455/450–455, 502, 509; 370/310–320
See application file for complete search history.

(56) References Cited

U.S. PATENT DOCUMENTS

| | | | |
|---|---|---|---|
| 2013/0203432 A1* | 8/2013 | Wang | H04W 72/082 455/452.1 |
| 2013/0260753 A1* | 10/2013 | Sakai | H04W 48/20 455/434 |
| 2014/0113647 A1* | 4/2014 | Shen | H04W 76/028 455/452.1 |
| 2016/0007249 A1* | 1/2016 | Di Girolamo | H04W 36/0055 370/311 |
| 2016/0021017 A1* | 1/2016 | Thubert | H04L 47/28 370/235 |
| 2016/0198344 A1* | 7/2016 | Oba | H04W 12/06 455/411 |

OTHER PUBLICATIONS

IEEE Standards Association, "Part 15.4: Low-Rate Wireless Personal Area Networks (LR-WPANs) Amendment 1: MAC Sublayer", IEEE Standard for Local and Metropolitan Area Networks, IEEE Std 802.15.4E, 2012 (amendment to IEEE Std 802.15.4, 2011).
Internet Engineering Task Force (IETF), "RPL: IPv6 Routing Protocol for Low-Power and Lossy Networks", Winter, et al., Standards Track, RFC: 6550, ISSN: 2070-1721.

* cited by examiner

*Primary Examiner* — Fayyaz Alam
(74) *Attorney, Agent, or Firm* — Ronald O. Neerings; Charles A. Brill; Frank D. Cimino

(57) ABSTRACT

In accordance with various embodiments, a system and method of distributed transmission resource management in a wireless network is disclosed. The transmission resource allocation is distributed throughout the network to all nodes. In distributed resource management, the resource allocation may be performed by child and/or remote nodes and child and/or remote nodes actively manage transmission resource allocation in the wireless network.

20 Claims, 4 Drawing Sheets

FIG. 3
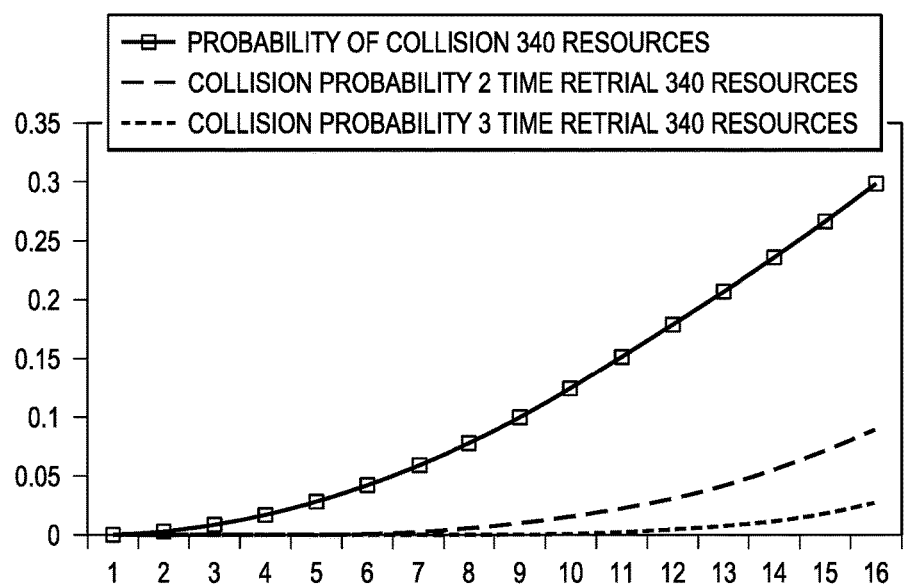
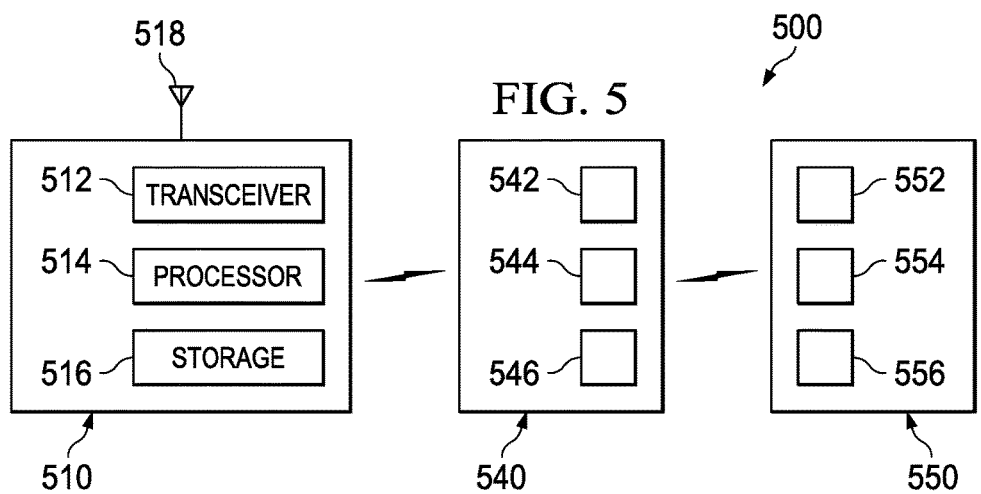
FIG. 5

SYSTEM AND METHOD FOR DISTRIBUTED SCHEDULING OF TRANSMISSION RESOURCES

CROSS-REFERENCE TO RELATED APPLICATIONS

This application claims priority to the U.S. provisional patent application Ser. No. 62/130,203, filed Mar. 9, 2015, the entirety of which is hereby incorporated herein by reference for all purposes.

TECHNICAL FIELD

This disclosure relates generally to the field of network resource management and more particularly to timeslot management for data transmission.

BACKGROUND

The IEEE standard has proposed a Time Slotted Channel Hopping (TSCH) protocol (802.15.4e), which defines a channel hopping medium access control scheme. FIG. 1 illustrates an exemplary operation 100 of conventional TSCH protocol. Various nodes in a network are assigned timeslots within different slot-frames using Absolute Slot Numbers (ASN). Depending on the channel hopping algorithm, each node 'hops' to a different channel during its allotted timeslot in a given slot-frame to transmit data.

The IEEE defined standard for TSCH allows low power devices to support a wide range of applications. In TSCH, timeslots synchronization impacts power consumption and preserves power; however, timeslots are assigned by a higher layer of the network. For example, if a network includes a central node, which is connected to a child node and the child node is connected to a grandchild node, then timeslot allocation for the grandchild node will be done by the central node. A centralized allocation of resources is an easy and less complex solution; however it introduces a high overhead in terms of messaging and energy efficiency. Furthermore, a resource allocation decision made without coordinating with routing protocols impacts the efficient functioning of the routing protocol. For example, a combination of TSCH and Routing Protocol for Low-Power and Lossy Networks (RPL) will cause issues if timeslot allocation is determined by the central node instead of RPL because in such case, RPL does not get involved in parent selection, which is the core function of RPL protocol and thus causes conflict. Similarly, a combination of TSCH with other protocols that require active participation of remote nodes in resource management will cause inefficiency and, at times, functional mismatch of various network components.

SUMMARY

In accordance with an embodiment a network element is disclosed. The network element includes a transceiver, and a processor coupled to the transceiver. The processor is configured to identify at least one transmission resource for communication in a wireless communication network, select a parent network node in the wireless communication network, transmit a request to establish a communication with the selected parent network node using the identified transmission resource, and establish the communication with the parent network node using the identified transmission resource.

In accordance with another embodiment, a method is disclosed. The method includes identifying, by a lower layer network element, at least one transmission resource for communication in a wireless communication network, selecting a network node in the wireless communication network, transmitting a request to establish a communication with the selected network node using the identified transmission resource, and establishing the communication with the network node using the identified transmission resource.

In accordance with yet another embodiment, an apparatus is disclosed. The apparatus includes a transceiver, and a processor. The processor is configured to identify at least one transmission resource for communication in a wireless communication network, select a higher layer network node in the wireless communication network, transmit a request to establish a communication with the selected higher layer network node using the identified transmission resource, and establish the communication with the higher layer network node using the identified transmission resource, wherein the apparatus is a lower layer network node in the wireless communication network.

BRIEF DESCRIPTION OF THE DRAWINGS

FIG. 3 illustrates an exemplary probability chart of resource conflict/collision within a 2-hop network using distributed resource management according to an embodiment.

FIG. 5 illustrates an exemplary structure of network nodes in wireless network according to an embodiment.

DETAILED DESCRIPTION

The following description provides many different embodiments, or examples, for implementing different features of the subject matter. These descriptions are merely for illustrative purposes and do not limit the scope of the invention.

In accordance with various embodiments, a system and method of distributed resource management in a network is disclosed. In distributed resource management, child and/or remote nodes actively participate in allocation and management of transmission resources.

Figure 1:
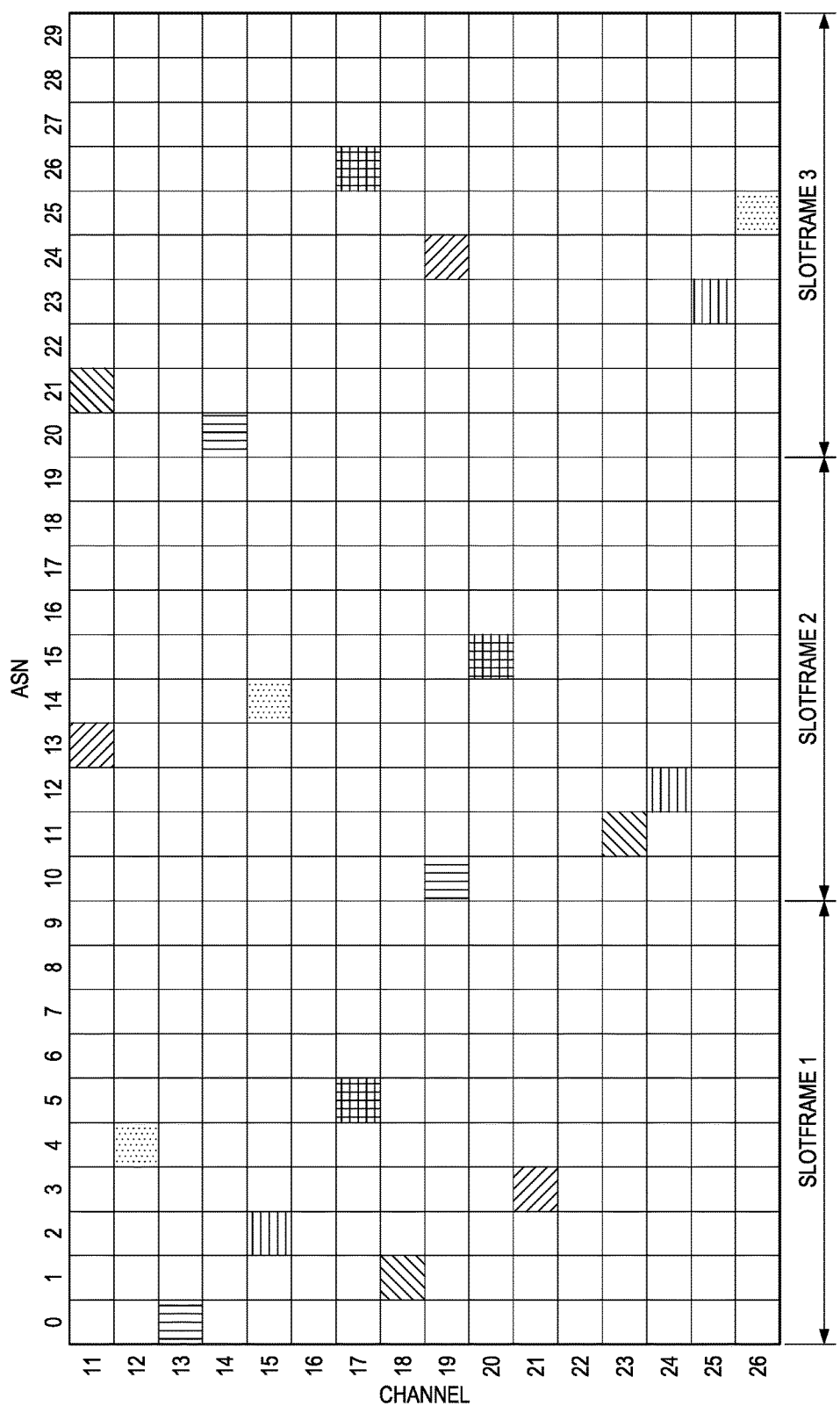
FIG. 1 illustrates an exemplary operation of conventional TSCH protocol.
Figure 2:
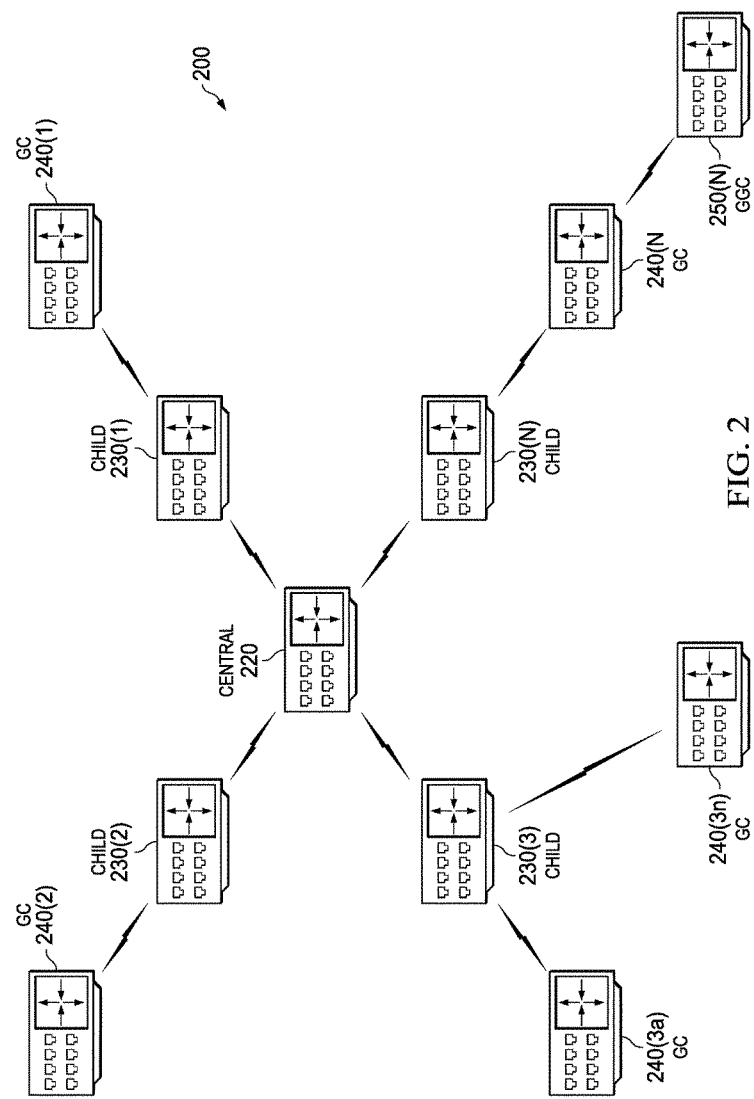
FIG. 2 illustrates an exemplary wireless network according to an embodiment.

Referring to FIG. 2, an exemplary wireless network 200 is illustrated according to an embodiment. Network 200 can be any form of network such as hierarchical network, mesh network, or the like. Network 200 includes a Central node 220. The Central node 220 can be any wireless communication network element for example, an access point, a network relay, a network extender, a wireless router, or any other device capable of connecting to a network and provide and manage wireless communication connections to various devices. The central node 220 can also be referred to the root node for the network 200. The network 200 further includes Child nodes 230(1)-(N), Grandchild nodes GC 240(1)-(N), and Greatgrandchild nodes GGC 250(N). While for explanation purposes, only one greatgrandchild node GGC 250(N) is shown, the network can include many other greatgrandchild nodes 250(1)-(N). Further, the network layers are not limited to the ones illustrated. The network 200 can include many other layers with respect to the Central node 220 and each child node can have multilayer networks below its own layer for example, as illustrated the child node 230(3) has multiple GC nodes GC240(3*a*)-(3*n*). Similarly, depending on the network layout, more complex network structures can be created to implement embodiments described herein. Child nodes, GC nodes, and GCC nodes can also be referred to a lower layer network node in the network where the central node controls all transmission resources. For exemplary and simplification purposes only one greatgrandchild node GGC 250(N) and few of the other nodes are shown; however, network 200 can include many Child, GC, and GGC nodes and further there can be many more network node layers beyond GGC nodes also.

The network layer relations among various nodes can be identified based on the connection distance from the central node 220. For example, the central node 220 can be considered as the root node or the first layer node. Child nodes 230 can be identified as the second network layer nodes and the center node 220 can be the parent node for child nodes 230. Similarly, GC nodes can be identified as the third network layer nodes and GGC nodes 250 can be identified as the fourth network layer nodes and the like. Each parent node can be identified as the higher network layer node for the child or grandchild node for example, GC nodes 240 can be parent nodes for GGC nodes 250, Child nodes 230 can be parent nodes for GC nodes 240, Center node 220 can be parent node for child nodes 230 and the like. Each parent node can be considered as the higher network layer node for a child or grandchild node and the like.

Conventionally, when a new node enters a network, then the node requests a handshaking to the central node 220 to establish communication either directly or through intermediate nodes such as for example, Child nodes 230, GC nodes 240, GGC nodes 250, or the like, depending on the network layer where the new node is entering the network 200. As stated herein, conventionally the central node controls and allocates transmission resources in the network and all other network nodes/elements that are lower layer nodes/elements, depend on the central node for resource allocation. Transmission resources in a conventional network are assigned by the central or root node and child nodes or lower layer nodes do not have control over transmission resource allocations.

According to an embodiment, when a new network node wants to join the network 200, then the new node 'listens' to transmission resources for example transmission channels and network traffic before transmitting any higher level messages to the higher network layers for a parent node selection negotiation. Once the new node obtains channel information; i.e., channel busy or not busy, noise, and other channel conditions, etc. then the new node selects a suitable parent node for communication and then selects available transmission resources such as time slots, channel offsets, and other related parameters if needed, for the selected parent node randomly from an available set of parameters. After selecting the parameters, the new node sends an association request indicating the timeslot/channel offset pair and other parameters if needed, to be used for communication with the parent node. If the parent node has no channel conflict, it sends a positive response to the new node and both nodes start using the negotiated resources. According to an embodiment, a child node or lower network layer node can identify a transmission resource for communication and the transmission resource allocation is distributed to lower network layer nodes. Thus, the child node or lower network layer node does not have to depend on the central node for transmission resource allocation.

According to another embodiment, during the communication operation, if the Received Signal Strength Indicator (RSSI) or the retransmissions of packets increases within selected transmission resources (e.g., timeslot, channel, or the like), then a node in the network 200 can enter into a probing state for a predetermined or random amount of time to determine whether the condition of selected transmission resources improves. If the condition of selected transmission resources improve within the predetermined or random time period, then the node reverts back to normal operation. If transmission resource conditions do not improve within the predetermined or random time period, then the node leaves the conflicting transmission resources and restarts the random transmission resource selection and assignment process. If a node requires more transmission resources during the operation, then the node can randomly select more available transmission resources and start using them as described herein. This allows for the node to accommodate its resources based on its traffic needs; thus, resulting in better performance for the network. On the other hand, the node can decrease the number of transmission resources if the traffic requirement gets lower, thus saving energy instead of performance. In this resource management operation, the central node does not get involved unless a node is communicating with the central node directly. All resource selections and decisions are made at the lower network level between two nodes.

Referring to FIG. 3, an exemplary probability of resource conflict/collision within a 2-hop network using distributed resource management is illustrated according to an embodiment. The collision probability is illustrated vs. a number of contending nodes for 340 Resources. The exemplary conflict probability is based on a network where 10 consecutive nodes contend for a random resource out of the available 340 resources. As illustrated, at first instance, a conflict results for only 10%-15% of the time. After running into a resource conflict, when nodes back-off and retry contending for resources, then the retrials conflict probability becomes less. Every retry results in much lower probability of resource conflict. The selection of resources can be done using any stochastic process such as for example, Transient Markov Chain, or the like, which can guarantee to converge to a solution for random selection of resources. This approach resolves a scheduling problem in a dynamic and distributed way and in the end, a resource setup converges.

The conflict free deterministic solutions also need to resolve a hidden nodes problem in a network. Hidden nodes in a wireless network are nodes that a given node cannot 'see,' which means those nodes are out of range of other nodes. The problem with hidden nodes is that occurs when hidden nodes start to send packets simultaneously to a receiving node. Because these nodes are 'hidden' from each other or they are out of range from each other, they cannot detect a collision while transmitting packets. According to another embodiment, for a conflict free deterministic scheduling, beacon payload may be used to communicate resource availability. A node may use the beacon payload to broadcast/communicate a periodic message in the network that may include timeslots and channel offset that are used by the node. The beacon message can indicate transmission resources of the node with the following exemplary options:

TX: Available for Transmission
RX: Available for Reception
No-TX: Not available for Transmission
No-RX: Not available for Reception Shared: Multiple nodes will be sharing the transmission resource Some exemplary resource indications are illustrated; however, any indication can be used to communicate the status of resource usage of a node to avoid conflict with other nodes in the network. For example, lower layer nodes can communicate directly with each other without the intervention of a central node to negotiate available resources and without advertising or broadcasting their status. Further, each resource can have a certain expiration time for transmission resources. For example, if a node broadcasts that it will be using a resource 'A', then if the node does not use the resource 'A' or keeps using resource 'A', then there can be a possibility that the node may block resource 'A' for long period of time. To avoid such conflict, according to an embodiment, each resource can have an associated 'life time' timer. For example, after capturing resource 'A', a node can use resource 'A' for a predetermined period of time and at the expiration of 'life time' timer, resource 'A' usage for the node may expire and resource 'A' will be available for other nodes to contend for.

According to an embodiment, each node in the network may 'listen' to its neighbor's beacons to get information on its neighborhood resource usage. The resource usage information can be communicated in various forms such as for example, a resource table with related information may be included in the beacon or the like. When a node receives the resource usage information from its neighbor node's beacon, then the node can construct its own resource usage information data such as for example, it can create its own resource usage table to keep track of neighborhood resource usage. Any node that desires to allocate a resource towards another node can select an available resource, for example, resource 'X', from the resource usage table and send a request to use resource 'X'. If the intended receiver node of the resource request detects no conflict in allocating resource 'X', then it can respond with a positive response. After a 'handshaking' between two nodes, both nodes can update their resource usage table to indicate the usage allocation of resource 'X'.

Initially, the resource usage broadcast and neighbor resource usage table processing may increase the number of beacons a node may receive and process; however, the beacon broadcasting may be suppressed gradually in time when the resource usage tables stabilize and are not updated frequently to conserve energy without losing synchronization with the network. If a conflict is detected in resource utilization, then as explained herein, the conflicted resource can be released within a predetermined timeout period if the conflict conditions do not improve. The distributed resource usage communication and allocation provides a dynamic and deterministic solution for resource scheduling. The resource allocation can be done using the frequency, time, and space diversity to its full extent. The resources can be dynamically dropped or allocated according to the changing needs of network nodes to improve the performance of energy consumption.

According to yet another embodiment, a lower layer node can broadcast a 'page' of resource information. A page can be a collection of resources that a node may desire to use or is using. The 'page' can also be a collection/group of resources, grouped during initial configuration/setup of the network. Each node in the network can broadcast its 'page' usage periodically within their beacon payload. A page usage can be marked with the following exemplary indications:

Uplink Page: The page is owned by the parent node and a resource has been assigned for this node's transmission to its parent.
Downlink Page: The page is owned by the node itself and all resources within the page are reserved for the node's usage towards its child/grandchild etc. nodes.
Heard Page: Indicates that another node within the 1-hop neighborhood is using this page, making it impossible for this node to use the same page.
Every node can listen to its neighbor's beacons to get its neighborhood usage 'page' and use the received information to construct its own resource information table.

According to an exemplary embodiment, two types of allocation can be made for each page: 1) Uplink and 2) Downlink. The uplink is typically assigned by a parent node during association and the uplink page is matched with the Downlink page of the selected parent node. The parent node may assign a resource from the Downlink page of its own resource page as an uplink resource to a newly joined node. The resource allocation includes at least a transmission and a reception resource for two-way communication.

The downlink page can be taken by a node by itself. If any conflict is detected in using the uplink and downlink resources then a 'life timer' can be assigned to each resource as explained herein and if the conditions do not improve, then conflicted resources can be released within a predetermined or random timeout interval. According to another embodiment, a full dynamic and deterministic solution can be provided to resource scheduling problem. The overhead of resource negotiation can be reduced as a page allocation can reserve multiple resources for a node. When a resource page is underutilized, then the resources can be released after a certain idle time. For example, if a node reserves a page of resources and if resources are not used for certain predetermined or random time period, then the node may be required to release resources and update its beacon broadcast. The resources can be increased or decreased within a page as these resources are already reserved and owned by a node. When a page includes both types of resources, transmission and reception, then the page cannot be identified as single transmission or reception resource.

Figure 4:
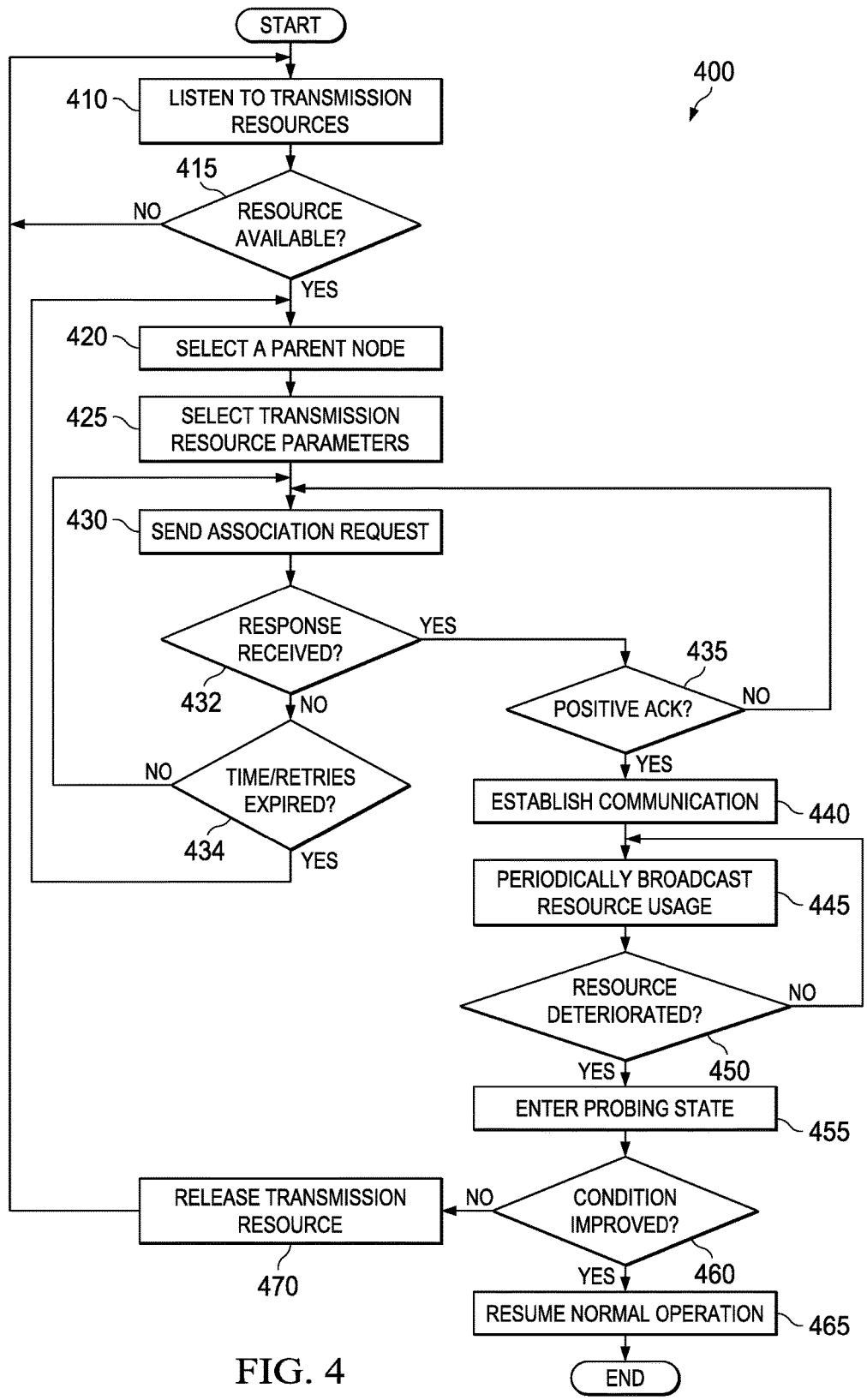
FIG. 4 illustrates an exemplary flow diagram of a process for distributed scheduling of transmission resources in a wireless network according to an embodiment.

Referring to FIG. 4, an exemplary flow diagram 400 of a process for distributed scheduling of transmission resources in a wireless network is illustrated according to an embodiment. A node that desires to join a network can initially listen to the network at 410 to identify a transmission resource for communication. If the node cannot locate resources at 415, then the node continues to monitor network resources at 410. If the node identifies available transmission resources, then at 420, the node selects a suitable parent node to associate with. At 425, the node selects transmission resource parameters such as time slots, channel offsets, and the like for communication with the selected parent node and at 430, the node transmits an association request to the selected parent node. At 432, the node determines if it received any response from the parent node. If the node does not receive any response, then this may indicate that there may be interference in the transmission medium. In that case, the node may try to connect to the same parent for a predetermined number of times or a predetermined period of time. At 434, the node determines if either the predetermined number of retires or the predetermined amount of time period has expired. If the number of retires or time period has not expired, then the node continues to try to establish the communication with the selected parent node at 430. If at 434 the node determines that the predetermined number of retires or the time period has expired and the node is unable to establish a communication link with the selected parent, then the node may proceed to select a different parent at 420.

If the node receives a response from the selected parent node then at 435, the node determines whether it received a positive response for the selected parent node. The node may find certain transmission resources as available for communication with the parent node; however, the selected parent node may have already allocated those resources to some other nodes. Based on the resource availability, the parent node may send a positive or a negative response to the node. If the selected parent node does not have any channel conflict for the selected transmission resources, then the parent node may send a positive response to the node. If the node does not receive a positive response and the replay is negative (e.g., no links available for communication), then the node restarts the process for selecting a suitable parent node to communicate with at 420. If the node receives a positive response from the selected node, then the node establishes a connection and association with the selected parent node at 440 and at 445 broadcasts its resource usage to other nodes in the network. As explained, the node can periodically broadcast a table or page of resources in its beacons based on a given implementation of the network protocol.

The node can continue to monitor the condition of transmission resources. At 450, the node determines whether the transmission resource condition (e.g., channel condition) has been deteriorated. The resource conditions can be determined based on the number of retransmission in the transmission resource, error rate, RSSI, and various other channel condition parameters. The node may determine whether resource conditions are within certain predetermined range and if resource conditions are not within predetermined range, then the resource can be identified as deteriorated. For example, if the measured RSSI on the resource is more than a predetermined range considered to be good for transmission, then the node can determine that the resource condition has deteriorated. If the transmission resource has not deteriorated, then the node continues to use the resources and broadcasts them in its beacons. If the condition of transmission resources has deteriorated, then the node enters into a probing state at 455 for a predetermined period of time. If after the predetermined period, at 460 it is determined that the transmission resource conditions have improved, then the node resumes normal operation at 465 by using the resources for transmission. If the transmission resource conditions do not improve after the predetermined period of time, then the node releases the conflicting/deteriorated resources at 470 and restarts random resource selection and assignment at 410.

Referring to FIG. 5, an exemplary structure of network nodes (child/grandchild, intermediate, central, etc.) in wireless network 500 is illustrated according to an embodiment. Network 500 includes an exemplary network node 510. The network node 510 can be any wireless communication network node for example, an industrial control system, a wireless communication device, a smart phone, or any other communication device capable of wireless communication. The network node 510 includes a transceiver 512, a processor 514, a storage device 516, and an antenna 518 among various other system components. Only simple elements are shown for the purpose of explanation. However, the network node 510 can include various others system components and multiple elements for example, the network node 510 can have multiple processors, antennas, storage devices, transceivers, displays, user interface, and the like.

The network 500 also includes various other wireless communication devices such as for example, nodes 540 and 550. For exemplary purposes only illustrated nodes are described. However, network 500 can have multiple nodes such as for example as illustrated in FIG. 2. The network 500 can also include many other devices capable of wirelessly communicating with the network node 510 such as control systems, printers, consumer electronic devices, smart phones, and various other devices and systems capable of wireless communication. Further, the network node 510 can also be communicatively coupled to other network nodes in a mesh or other types of network schemes. Each of the network nodes 540 and 550 may also include various other system components such as transceivers 542 and 552, processors 544 and 554, storage devices 546 and 556, and other components like displays, keyboards, antennas, other user interface, and the like (not shown). These nodes may communicate with each other in the network 500 using embodiments described herein for distributed selection of transmission resources for improved resource utilization and power efficiency.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A network element comprising:
   a transceiver configured to receive network transmissions; and
   a processor coupled to the transceiver, the processor is configured to select at least one transmission resource in response to the network transmissions,
   select a parent network node in a wireless communication network,
   transmit by the transceiver a request to establish a communication with the selected parent network node using the selected transmission resource,
   receive permission from the parent network node to use the selected transmission resource, and
   establish the communication with the parent network node using the selected transmission resource.

2. The network element of claim 1, wherein the network element is a lower layer network node in the wireless communication network, and the parent network node is a higher layer network node in the wireless communication network.

3. The network element of claim 1, wherein the processor is further configured to broadcast transmission resource usage in the wireless network, wherein the broadcast indicates the at least one transmission resource as a resource allocated to the network element for communication in the wireless communication network.

4. The network element of claim 3, wherein the processor is configured to broadcast the transmission resource usage in a beacon transmission.

5. The network element of claim 3, wherein the broadcast identifies a plurality of transmission resources allocated to the network element for communication in the wireless communication network.

6. The network element of claim 1, wherein the transmission resource includes one or more of a communication timeslot and a channel offset.

7. The network element of claim 1, wherein the processor is further configured to determine whether one or more of a Received Signal Strength Indicator (RSI) or a number of retransmissions on the identified transmission resource is within a predetermined range, and
   release the transmission resource if the RSSI or the number of retransmissions on the identified transmission resource is not within the predetermined range for a predetermined period of time.

8. The network element of claim 1, wherein the parent node is a central node in the wireless communication network.

9. A method comprising:
   receiving network transmissions in a wireless communication network;
   selecting, by a lower layer network element, at least one transmission resource for communication in the wireless communication network in response to the network transmissions;
   selecting a network node in the wireless communication network;
   transmitting a request to establish a communication with the selected network node using the selected transmission resource;
   receiving permission from the network node to use the selected transmission resource; and
   establishing the communication with the network node using the selected transmission resource.

10. The method of claim 9, wherein the network node is a higher layer network node in the wireless communication network.

11. The method of claim 10, further comprising:
    broadcasting transmission resource usage in the wireless communication network, wherein the broadcasting indicates the at least one transmission resource as a resource allocated to the lower layer network element for communication in the wireless communication network.

12. The method of claim 11, wherein the transmission resource usage is broadcasted in a beacon transmission.

13. The method of claim 11, wherein the broadcast identifies a plurality of transmission resources allocated to the lower layer network element for communication in the wireless communication network.

14. The method of claim 9, wherein the transmission resource includes one or more of a communication timeslot and a channel offset.

15. The method of claim 9, further comprising:
    determining whether one or more of a Received Signal Strength Indicator (RSSI) or a number of retransmissions on the identified transmission resource is within a predetermined range, and
    releasing the transmission resource, if the RSSI or the number of retransmissions on the identified transmission resource is not within the predetermined range for a predetermined period of time.

16. A method of operating a network node, comprising:
    selecting at least one transmission resource by the network node for communication in a wireless communication network;
    selecting a higher layer network node in the wireless communication network;
    transmitting a request to establish a communication with the selected higher layer network node using the selected transmission resource;
    receiving permission from the selected higher layer network node to use the selected transmission resource; and
    establishing the communication with the selected higher layer network node using the selected transmission resource.

17. The method of claim 16, comprising:
    determining at least one transmission condition of the at least one transmission resource;
    entering into a probing state for a predetermined period of time, if the transmission condition of the at least one transmission resource not within a predetermined range; and
    releasing the transmission resource, if the transmission condition of the at least one transmission resource is not within the predetermined range for a predetermined period of time.

18. The method of claim 17, wherein the transmission condition includes one or more of a Received Signal Strength Indicator (RSSI), and a number of retransmissions on the at least one transmission resource.

19. The method of claim 16, wherein the network node is further configured to broadcast a beacon in the wireless communication network, wherein the beacon identifies the at least one transmission resource as a resource allocated to the apparatus for communication in the wireless communication network.

20. The method of claim 16, wherein the transmission resource includes one or more of a communication timeslot and a channel offset.

\* \* \* \* \*